April 20, 1937.  E. V. TAYLOR  2,077,909
BRAKE
Filed July 26, 1930

INVENTOR.
EUGENE V TAYLOR
BY M. W. McConkey
ATTORNEY

Patented Apr. 20, 1937

2,077,909

UNITED STATES PATENT OFFICE 2,077,909

BRAKE

Eugene V. Taylor, Chicago, Ill., assignor to Bendix Brake Company, South Bend, Ind., a corporation of Illinois Application July 26, 1930, Serial No. 470,799

3 Claims. (Cl. 188—78)

This invention relates to brakes and more particularly to internal expanding brakes.

An important object of the invention is the provision of a friction member designed to provide uniform flexibility throughout its length during a period of application thereof.

Another important object of the invention is the provision of a friction element in which the inherent tendency to grab is eliminated.

Another important object of the invention is the provision of a friction element which may be easily controlled and will provide a soft sensitive pedal action.

An important feature of the invention is a friction element comprising a band gradually tapering in cross section.

Another important feature of the invention is a friction element comprising a tapering band gradually increasing in cross section in proportion to the increase in applied force, so that a uniform flexibility of the band may be attained to provide a smooth braking effect.

Other objects and features of the invention will appear from the following description forming a part of this specification, and in which.

Figure 1:
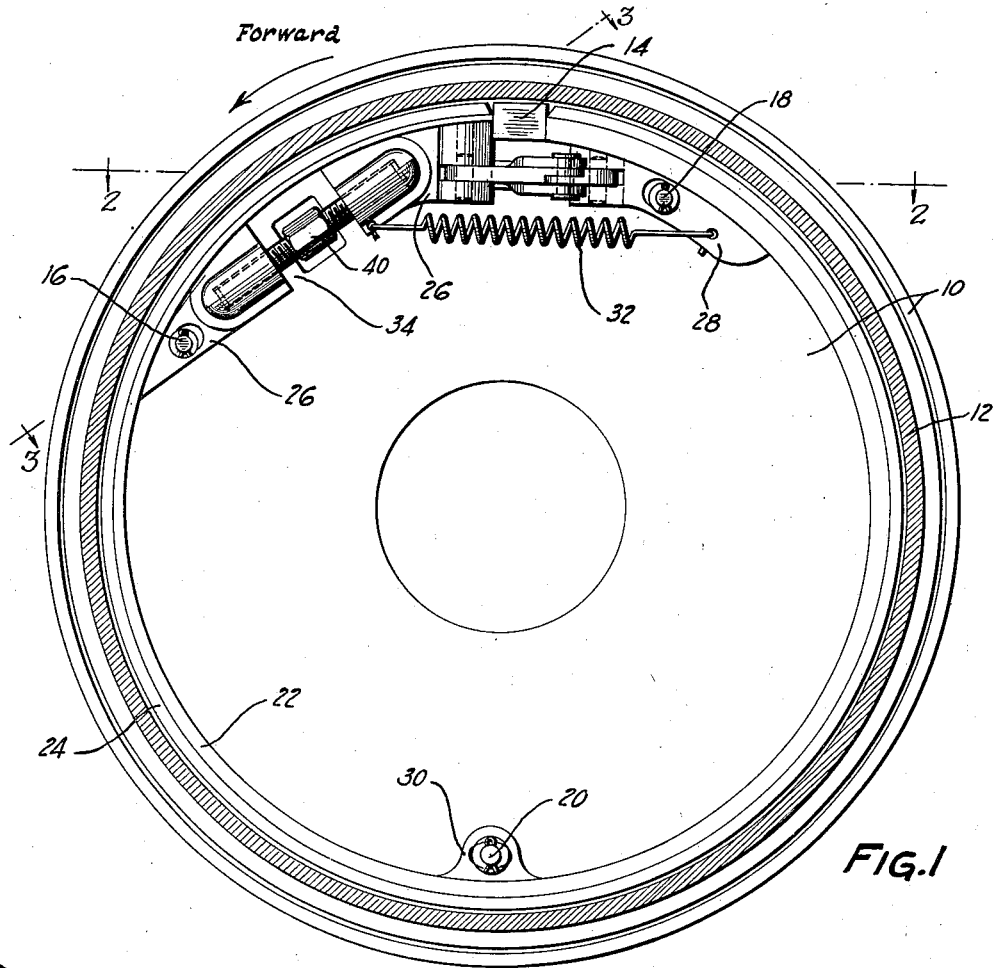
Figure 1 is a sectional view of a brake taken just back of the head of the drum illustrating the invention as applied.
Figures 2, 3:
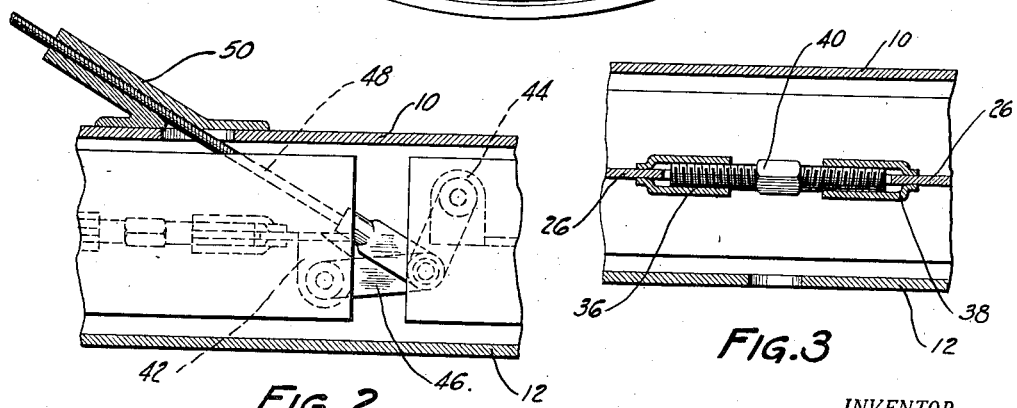
Figure 2 is a sectional view substantially on line 2—2, Figure 1.
Figure 3 is a sectional view substantially on line 3—3, Figure 1.

Referring to the drawing for more specific details of the invention, 10 represents a fixed support such as a backing plate having associated therewith a rotatable drum 12 which may be secured to any suitable rotatable member, such as a vehicle wheel. The backing plate 10 has positioned thereon a fixed anchor 14 and suitable steady rests 16, 18, and 20. Positioned for movement on the backing plate is a friction element 22 comprising a band gradually tapering in cross section throughout its length. This band has secured on its face a friction lining 24 adaptable for engagement with the drum.

As shown, the separable ends of the friction element are provided with relatively short flanges 26 and 28, and the band is further provided with a flange 30 arranged in spaced relation to the flanges 26 and 28. These flanges receive the steady rests 16, 18, and 20, and connected between the flanges 26 and 28 is a spring 32 adapted to return the friction element to the off position and to retain it in proper spaced relation to the drum.

The flange 26 on the smaller or thinner end of the band or the servo end of the friction element is divided into two parts separated by a gap indicated at 34 to provide suitable supports (the left-hand one secured to the band and the right-hand one movable thereon) for oppositely disposed internally threaded sleeves 36 and 38 formed by pairs of stampings having registering grooves and secured to the sides of the parts of web 26 over slots formed therein. These sleeves are reversely threaded and positioned in the sleeves is a reversely threaded turn screw 40. This structure materially stiffens the servo end of the friction element, and by means thereof suitable adjustment may be maintained between the servo end of the shoe and the drum.

The flange 26 has a lug 42 and the flange 28 has a lug 44. These lugs are positioned relatively near the separable ends of the friction element and extend in opposite directions. As shown, a toggle 46 is connected between the lugs and connected to the knee of the toggle is an operating cable 48 extending through the backing plate and a suitable bracket 50 positioned thereon.

It is to be observed that when force is applied to the toggle through the operating cable, the separable ends of the friction element move apart and engage the element with drum. Thrust is received at the small end or the servo end of the friction element, the applied force received is relatively small, and this applied force tends to compress or flex the element.

Since the element is gradually increased in cross section from the servo end throughout its length, a portion thereof, substantially the central portion, receives the toggle thrust plus the servo action of the servo end of the friction element, and since this portion is relatively heavy as compared to the servo end, it will distribute the load uniformly.

At the heel portion of the friction element, the toggle thrust plus the servo action of the entire element tends to compress or flex the friction element and consequently this portion of the friction element should be considerably heavier or stiffer, so that a uniform flexibility may be maintained throughout the entire length of the friction element in order to obtain a brake possessing smoothness in application and a soft sensitive pedal action free from grabbing and gripping.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element rectangular in cross-section and of tapering cross section, flanges on the respective separable ends of the friction element, lugs on the flanges extending in opposite directions, a toggle connecting the lugs and an operating cable connected to the knee of the toggle.

2. A brake comprising a drum and a backing plate, a friction member having adjacent separable ends and which is housed in the space between the drum and backing plate, a toggle including pivotally connected links one of which engages one of said ends adjacent the backing plate and the other of which engages the other of said ends adjacent the head of the drum and which are arranged at an angle whose bisector is at an acute angle to the backing plate, and a flexible tension element operatively connected to said toggle and extending at an acute angle to and through the backing plate.

3. In a brake of the shiftable anchorage type having a backing plate, an anchor post secured to said backing plate and applying means adjacent said anchor post; a brake band having separable ends operatively engaged by said applying means and shiftably disposed on opposite sides of said anchor post, one of said ends normally engaging said post in forward braking, said band being formed with a rectangular cross-section decreasing in thickness from said normally anchor-engaging end to said other end.

EUGENE V. TAYLOR.